US009045669B2

(12) United States Patent
Herzog et al.

(10) Patent No.: US 9,045,669 B2
(45) Date of Patent: Jun. 2, 2015

(54) COMPOSITIONS CONTAINING DIALKYLETHERS, THUS PRODUCED COATINGS AND USE OF DIALKYLETHERS

(75) Inventors: Oliver Herzog, Geesthacht (DE); Karin Schons-Luder, Brunsbuttel (DE)

(73) Assignee: Sasol Germany GmbH, Hamburg (DE)

( * ) Notice: Subject to any disclaimer, the term of this patent is extended or adjusted under 35 U.S.C. 154(b) by 271 days.

(21) Appl. No.: 13/497,718

(22) PCT Filed: Sep. 22, 2010

(86) PCT No.: PCT/DE2010/001107
§ 371 (c)(1),
(2), (4) Date: Jun. 5, 2012

(87) PCT Pub. No.: WO2011/035766
PCT Pub. Date: Mar. 31, 2011

(65) Prior Publication Data
US 2012/0240822 A1 Sep. 27, 2012

(30) Foreign Application Priority Data

Sep. 23, 2009 (DE) .................. 10 2009 042 447

(51) Int. Cl.
| | |
|---|---|
| C04B 28/36 | (2006.01) |
| C09D 7/00 | (2006.01) |
| C09D 201/00 | (2006.01) |
| C09D 5/03 | (2006.01) |
| C09D 7/12 | (2006.01) |
| C08K 5/06 | (2006.01) |

(52) U.S. Cl.
CPC ................ *C09D 201/00* (2013.01); *C08K 5/06* (2013.01); *C09D 5/033* (2013.01); *C09D 7/1233* (2013.01); *C09D 7/1258* (2013.01)

(58) Field of Classification Search
USPC ......................... 106/287.23, 287.35
See application file for complete search history.

(56) References Cited

U.S. PATENT DOCUMENTS

| | | | | | |
|---|---|---|---|---|---|
| 2,720,869 | A | * | 10/1955 | Bevans .......................... | 123/1 A |
| 2,794,007 | A | | 5/1957 | Taylor et al. | |
| 2,873,202 | A | * | 2/1959 | Chapman ...................... | 106/230 |
| 2,932,586 | A | * | 4/1960 | Wilson et al. ................. | 427/142 |
| 3,816,154 | A | | 6/1974 | Baldyga et al. | |
| 5,356,971 | A | | 10/1994 | Sagawa et al. | |
| 6,242,058 | B1 | * | 6/2001 | Bahadur et al. ............... | 427/515 |
| 2001/0006993 | A1 | * | 7/2001 | Ring et al. .................... | 524/599 |
| 2004/0224234 | A1 | * | 11/2004 | Bauer et al. ................... | 429/309 |

FOREIGN PATENT DOCUMENTS

| | | |
|---|---|---|
| DE | 1006100 | 4/1957 |
| EP | 1095111 | 4/2004 |
| GB | 913044 | 12/1962 |
| JP | 50010819 | 2/1975 |
| JP | 2002519498 | 7/2002 |
| JP | 2002519499 | 7/2002 |

* cited by examiner

*Primary Examiner* — James McDonough
(74) *Attorney, Agent, or Firm* — Bushman Werner, P.C.

(57) ABSTRACT

The invention relates to compositions for producing coatings containing dialkylether as an additive, said type of coatings and to the use of dialkylethers in coatings, in particular a novel paint and lacquer additive based on dialkylether as a component of said compositions, said additive improving the resistance to abrasion, chemical resistance and mechanical properties to the lacquer system without changing the color metrics and reactivity.

12 Claims, 1 Drawing Sheet

Comparison of Flexibility and Abrasion Resistance

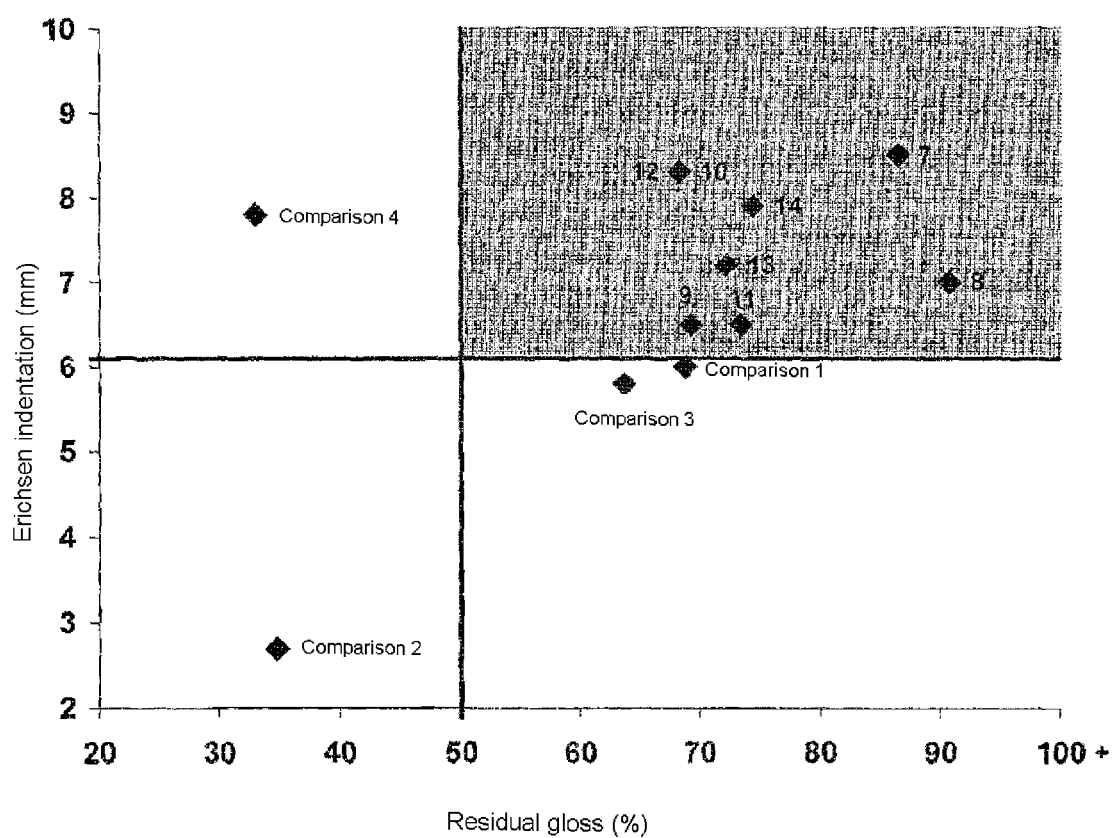

COMPOSITIONS CONTAINING DIALKYLETHERS, THUS PRODUCED COATINGS AND USE OF DIALKYLETHERS

CROSS REFERENCE TO RELATED APPLICATION

This application is a U.S. National of International Application PCT/DE2010/001107, filed on Sep. 22, 2010, which claims priority to DE 102009042447.4, filed on Sep. 23, 2009, the disclosures of which are incorporated herein by reference for all purposes.

BACKGROUND OF THE INVENTION

1. Field of the Invention

The invention relates to a composition for producing coatings containing dialkyl ethers as an additive and it relates to the use of such compositions in coatings as well as coatings produced in this way.

2. Description of Prior Art

It is known that additives are used to improve the properties of paints and varnishes. A wide variety of substances, for example, waxes, are known and used as additives. Waxy varnish additives may be introduced in the form of wax-coated solid particles, which often act as delustering agents.

DE 1006100 B (corresponds to U.S. Pat. No. 2,838,413) discloses the production of a delustering agent of silicic acid hydrogels, which are dried, activated at elevated temperatures and impregnated with a petroleum wax of the chain length C50 to C60 with a low acid number, iodine number and saponification number as well as with a melting point above 80° C.

U.S. Pat. No. 3,816,154 describes the use of wax-coated silica gels as delustering agents in varnishes. The wax is applied to the silica gel particles either as a melt coating or as an emulsion coating. If the silica gel is coated with waxes and fatty acids at the same time, a better dispersibility and better light scatter properties are found. The additive composition is milled in a jet mill to a particle size of 2 μm to 10 μm, wherein the wax is a petroleum or polyolefin wax and the fatty acid used has a chain length of C12 to C18.

US 2001/0006993 discloses a dry-mixed additive consisting of one or more film-forming polymeric components and one or more carrier components based on alumina, aluminum hydroxide, wax-coated silica gel or a combination thereof. This additive is being promoted as a gloss-reducing agent.

EP 1095111 describes a powder varnish composition in which a wax-coated silicon dioxide in finely divided form is added as an additive by a dry mixing method wherein it may also contain aluminum oxide and aluminum hydroxide. The waxes used are natural animal wax (for example, beeswax and lanolin) or natural vegetable waxes (for example, carnauba wax), petroleum waxes (for example, paraffin wax, microcrystalline wax) or synthetic waxes (for example, polyethylene, polyol ether esters). In addition, long-chain esters and hydrocarbons may be used.

U.S. Pat. No. 5,356,971 discloses that synthetic or natural wax added to powder coatings creates better lubricant properties and water repellency. No negative effect on the weather resistance is observed. The melting point of the wax should be in the range of 50° C. to 280° C. and ideally is 10° C. to 20° C. below the processing temperature. The group of waxes comprises natural animal, vegetable and petroleum waxes or mineral waxes as well as long-chain esters. If pure wax is used, it has a negative effect on the adhesion of the powder coating to metal at higher wax contents (for example, >10 wt %). If a supported wax is used, the scratch resistance suffers a negative effect of more than 15% even at load levels of more than 15%.

SUMMARY OF THE INVENTION

In one aspect of the present invention provides an additive, which yields improved properties of the paint and/or varnish in various paint and varnish systems.

It has surprisingly been found that these additives in paints and varnishes with long chain dialkyl ethers lead to a higher flexibility, greater chemical resistance and scratch resistance of the hardened coating compositions.

BRIEF DESCRIPTION OF THE DRAWINGS

The single FIGURE shows a comparison of flexibility and abrasion resistance and the improvement using the present invention.

DESCRIPTION OF PREFERRED EMBODIMENTS

The dialkyl ethers and/or dialkyl ether mixtures have 24 or more carbon atoms, in particular 32 to 44 carbon atoms. The dialkyl ethers and/or dialkyl ether mixtures are solid at room temperature (25° C.). These are preferably symmetrical dialkyl ethers. Long-chain saturated and unsaturated dialkyl ethers are suitable, for example, but are not limited to this list: didodecyl ether, ditetradecyl ether, dihexadecyl ether, dioctadecyl ether, dieicosyl ether, didocosyl ether, ditetracosyl ether, dihexacosyl ether, dioctacosyl ether, ditriacontyl ether, didotriacontyl ether as well as mixtures thereof.

By adding the inventive additives consisting of long-chain dialkyl ethers to paints and varnishes, in particular to powder coatings, the flexibility and chemical resistance as well as the scratch resistance can be increased.

The dialkyl ethers are preferably used as solid particles, in particular with average particle sizes ($D_{50}$) of less than 150 μm, in particular less than 60 μm. According to one embodiment, the dialkyl ether is added in micronized form (average particle diameter, for example, $D_{50}$<60 μm, preferably $D_{50}$<15 μm) to the coating composition, such as a paint or a varnish. In another embodiment, it is applied to an inorganic carrier material (for example, $D_{50}$<150 μm, preferably $D_{50}$<30 μm) and in yet another embodiment, it is added to the formulation prior to homogenization. The particle size and/or the average particle diameter $D_{50}$ is determined using a Malvern Mastersizer 2000 in accordance with ISO 13320-1, with the results being analyzed according to the Fraunhofer theory.

Inorganic compounds may be used as the carrier materials. Special effects are achieved, depending on the material and the surface properties. Suitable materials include silica, silica gels, aluminas and alumina hydrates. In this context, products of a high specific surface area (for example, >140 $m^2/g$, measured by means of BET from $N_2$ according to DIN ISO 9277) have proven to be especially suitable. These products can be coated with the dialkyl ethers with no problem with loads up to 70 wt %, based on the sum of the carrier and the dialkyl ether, without any loss of pourability. If products of a lower specific surface area are used, a lower dialkyl ether load must be used. Maximum loads of 35 wt % have proven practical for a surface area of <50 $m^2/g$, maximum loads of 50 wt % at 50-140 $m^2/g$ and up to 70 wt % at >140 $m^2/g$.

Varnishes in the sense of the present invention may be differentiated according to aqueous varnish systems containing a solvent and those that are free of solvent. Solvent-based varnishes are further differentiated into systems that are film-forming systems at ambient temperature and baked-on enamels that can dry physically or chemically.

All solvent-based varnishes contain pigments, fillers, binders, solvents and other additives. Solvents may include (but are not limited to), for example, hydrocarbons such as benzines, naphtha, xylene, toluene, alcohols such as methanol, ethanol, propanol, butanol, pentanol, hexanol, esters such as ethyl acetate, butyl acetate, ethers such as dipropyl ether, dibutyl ether, dipentyl ether, dihexyl ether, diheptyl ether, dioctyl ether, dinonyl ether, didecyl ether, ethyl glycol, butyl glycol or butyl diglycol. Pigments may be of an organic and/or inorganic type.

Additional additives suitable in the sense of the present invention include, for example, heavy metal salts of carboxylic acids as siccatives for oxidatively curing systems, anti-skinning agents such as ketoxime, UV absorbers, plasticizers such as the esters of phthalic acid, adipic acid, trimellitic acid, sebacic acid, citric acid, phosphoric acid, benzoic acid or fatty acids with alcohols, hydrocarbons, chlorinated paraffins or epoxidized fatty acid esters or oils, flow agents or dispersant aids.

For example, systems which are film-forming at ambient temperatures by physical drying may contain binders such as cellulose nitrate, other cellulose esters, polyvinyl halides and copolymers thereof, polyvinyl esters, polystyrene, hydrocarbon resins, rubber derivatives, high-polymer epoxy resins, polyamides, polycarbonates and polyacrylate resins.

In systems which dry chemically according to the present invention, the binders are oxidized by the action of atmospheric oxygen, for example, as in polyunsaturated oils, alkyd resins or epoxy resin esters. Another possibility for chemically drying systems includes, for example, two-component systems such as two-component polyurethane varnishes, where the binder dries by reaction of isocyanate groups with alcohol groups. Alcohol groups may be present, for example, in saturated polyesters, alkyd resins, acrylate resins, polyethers, epoxy resins and epoxy esters, PVC copolymers or polyvinylacetals.

Baked-on enamels form films only at temperatures between 80° C. and 250° C. Binders may be constructed of at least two reactive components such as amino resins as well as self-crosslinking building blocks.

Basic building blocks here form amides such as urea, carbonate, melamine, benzoguanamine or glycoluril and formaldehyde. Amino resins may also be reacted with binders containing hydroxyl groups such as alkyd resins, saturated polyesters, hydroxy-functional acrylate resins, epoxy resins, epoxy resin esters and polyvinyl resins. Another possibility is phenolic resins obtained by reaction of phenols with formaldehyde. Baked-on enamels based on capped polyisocyanates, acrylate resins, polyesters or polysiloxanes are also known.

The solvent-based varnish systems can be differentiated according to "low solids" (<30%), "normal solids" (30-60%), "medium solids" (60-70%) and "high solids" (>70%), depending on the nonvolatile component.

In contrast with the solvent-based varnish systems, aqueous varnish systems contain water as the main solvent. In addition, co-solvents such as ethanol, propanol, isopropanol or butanol may also be used. Polymer dispersions, for example, acrylic dispersions, styrene dispersions, acrylate dispersions, vinyl acetate-ethylene copolymer dispersions in water, water-dilutable alkyd resins and/or epoxy resins may be used as binders here.

Further additives in aqueous varnish systems may include rheology additives such as polymers or inorganic phyllosilicates, dispersants such as polyacrylates or polyphosphates, foam suppressants, for example, based on hydrocarbons or silicones, preservatives, film-forming aids, pH stabilizers or anti-corrosion additives. Like solvent-based baked-on enamels, these are also available as aqueous systems.

Solvent-free varnish systems may be either chemically reactive systems, for example, two-component polyurethane varnishes in which either a liquid polyol reacts with a liquid polyisocyanate, or a liquid blocked isocyanate group-terminated prepolymer reacts with a liquid polyamine, two-component epoxy resins, two-component unsaturated polyesters, for example, linear, soluble polycondensates of unsaturated and partially saturated dicarboxylic acids, for example, maleic acid anhydride or fumaric acid and polyvalent alcohols, such as ethylene glycol, 1,3-propanediol, diethylene glycol or neopentyl glycol.

Another possibility for curing the products is UV-induced drying, wherein a radical crosslinking reaction is triggered by UV light. Binders for UV enamels include, for example, unsaturated polyesters, acrylates, for example, epoxy acrylates, polyester acrylates, polyether acrylates, polyurethane acrylates and saturated acrylate resins or silicone acrylates.

No solvent is used in powder coatings, which cure in the melt. A low melt viscosity is desired. The powder usually has an average grain size of 18 µm to 80 µm. Binders used for thermoplastic powder coatings include polyethylene, polyvinyl chloride, polyamides, ethylene-vinyl-alcohol copolymers and saturated polyesters; binders used for crosslinking powder coatings include epoxy resins, epoxy resins/polyesters, hybrid systems, polyurethane polyester systems or acrylate resins.

Other suitable varnish systems and their exemplary compositions are described, for example, in the textbook "Varnish Formulation and Varnish Recipes" by Bodo Müller and Ulrich Poth, published by Vincentz Verlag. This textbook is herewith also incorporated into the disclosure content of the present invention.

The invention is explained by the following example:

The paint additive was prepared by joint milling of the dialkyl ethers and the inorganic carrier to form particles.

Example 1

Preparing an Additive Based on Silicic Acid 50 g dioctadecyl ether (NACOL® Ether 18 from Sasol, Germany GmbH) was weighed into a batch mill together with 50 g of a silica (for example, Aerosil® 300 from Evonik) and milled for five minutes. The product was thermally regulated for one hour at 80° C.

Example 2

Producing an Additive Based on Alumina 50 g dioctadecyl ether (NACOL® Ether 18 from Sasol, Germany GmbH) was weighed in a batch mill together with 50 g of an alumina (Puralox® UF5/230 from Sasol, Germany GmbH) and milled for five minutes. The product was thermally regulated at 80° C. for one hour.

In the following examples the dialkyl ether was applied by heat impregnation of the inorganic carrier.

Example 3

Producing an Additive Based on Silica 50 g dioctadecyl ether (NACOL® Ether 18 from Sasol, Germany GmbH) mixed with 50 g of a silica (for example, Aerosil® 300 from Evonik). After cooling, the solids were milled for five minutes in a batch mill.

Example 4

Producing an Additive Based on Alumina 50 g dioctadecyl ether (NACOL® Ether 18 from Sasol, Germany GmbH) was mixed with 50 g of a alumina (for example, Disperal® HP 14☐ from Sasol, Germany GmbH). After cooling, the solids were milled for five minutes in a batch mill.

According to another embodiment, the organic coverage of polysilicic acid or alumina hydrate was added before drying.

Example 5

Producing an Additive Based on Silica 50 g dioctadecyl ether (NACOL® Ether 18 from Sasol, Germany GmbH) was melted and combined with 50 g dry solids of a freshly prepared polysilicic acid. The product was dried at 120° C. and then ground to the desired grain size.

Example 6

Producing an Additive Based on Alumina 50 g dioctadecyl ether (NACOL® Ether 18 from Sasol, Germany GmbH) was melted and combined with 50 g dry solids of a freshly prepared alumina hydrate. The product was dried at 120° C. and then ground to the desired grain size.

Another possibility is to use the dialkyl ether(s) directly in solid form, for example, as a powder or pastilles.

The following raw materials were used in the following examples:

TABLE I

Raw Materials

| Brand name | Chemical name | Manufacturer |
|---|---|---|
| Crelan ® EF 403 | cycloaliphatic polyuretdione (MW = 310 g/mol) | Bayer |
| Rucote ® XP 2566 | polyester (OH number 38) | Bayer |
| Rucote ® 109 | polyester containing hydroxyl groups (OH number 265) | Bayer |
| Resiflow ® PV 88 | acrylate flow control agent based on silicate | Worlée |

The additives produced in this way were used in powder coatings. This will now be illustrated on the following examples:

TABLE II with Examples 7 through 9

| Example No. | Additive |
|---|---|
| 7 | Example 2 |
| 8 | Example 4 |
| 9 | Dioctadecyl ether |

160.9 g Crelan® EF 403, 224.8 g Rucote® XP 2566, 96.1 g Rucote® 109, 6.0 g Resiflow® PV 88, 2.5 g benzoin, 5 g Gas Black FW 200 and 5 g of the additive were homogenized for five minutes in a mixer at 10,000 rpm. Next the mixture was extruded in a twin-screw extruder at temperatures of 100° C. (zone 1) and 110° C. (zone 2) at a shaft speed of 200 rpm, product temperature 110° C. to 115° C., a rotational speed of the feed screw of 15 rpm and a rotational rate of the cooling roller of 40 rpm. The powder coating extrudate was pulverized and then milled finely in a screen-bottom mill at 10,000 rpm. Coarse-grain fractions larger than 120 µm in size were removed using a vibrating screen, and the powder was electrostatically applied to plate steel using a corona gun at 70 kV. The coating was baked for ten minutes at 200° C.

TABLE III with example 10 through 14:

| Example No. | Additive |
|---|---|
| 10 | Example 1 |
| 11 | Example 2 |
| 12 | Example 3 |
| 13 | dioctadecyl ether |
| 14 | dibehenyl ether |

157.5 g Crelan® EF 403, 220 g Rucote® XP 2566, 94 g Rucote® 109, 6.0 g Resiflow® PV 88, 2.5 g benzoin, 4.9 g Gas Black FW 200 and 15 g of the additive were homogenized for five minutes in a mixer at 10,000 rpm. The mixture was next extruded in a twin-screw extruder at temperatures of 100° C. (zone 1) and 110° C. (zone 2) at a shaft rotational speed of 200 rpm, product temperature 110-115° C., a rotational speed of the feed screw of 15 rpm and a rotational speed of the cooling roller of 40 rpm. The powder coating extrudates were pulverized and then ground finely at 10,000 rpm in a screen-bottom mill. Coarse-grain fractions greater than 120 µm in size were removed with a vibrating screen and the powder was applied electrostatically to a steel plate using a corona gun at 70 kV. The coated plates were based for ten minutes at 200° C.

Comparative Example 1

160.9 g Crelan® EF 403, 224.8 g Rucote® XP 2566, 96.1 g Rucote® 109, 6.0 g Resiflow® PV 88, 2.5 g benzoin, 5 g Gas Black FW 200 and 5 g of a micronized PE wax (from BYK) was homogenized for five minutes at 10,000 rpm in a mixer. The mixture was next extruded in a twin-screw extruder at temperatures of 100° C. (zone 1) and 110° C. (zone 2) at a shaft rotational speed of 200 rpm, a product temperature 110-115° C., a rotational speed of the feed screw of 15 rpm and a rotational speed of the cooling roller of 40 rpm. The powder coating extrudates were pulverized and then ground finely in a screen-bottom mill at 10,000 rpm. Coarse-grain fractions more than 120 µm in size were removed using a vibrating screen and the powder was applied to a steel plate electrostatically at 70 kV using a corona gun. The coated plates were baked for ten minutes at 200° C.

Comparative Example 2

160.9 g Crelan® EF 403, 224.8 g Rucote® XP 2566, 96.1 g Rucote® 109, 6.0 g Resiflow® PV 88, 2.5 g benzoin, 5 g Gas Black FW 200 and 5 g of a powdered synthetic polymer (Ceraflour® 967, from BYK) were homogenized for five minutes at 10,000 rpm in a mixer. Next the mixture was extruded in a twin-screw extruder at temperatures of 100° C. (zone 1) and 110° C. (zone 2) at a shaft rotational speed of 200 rpm, product temperature 110-115° C., a rotational speed of the feed screw of 15 rpm and a rotational speed of the cooling roller of 40 rpm. The powder coating extrudates were pulverized and then ground finely in a screen-bottom mill at 10,000 rpm.

Coarse-grain fractions more than 120 μm in size were removed using a vibrating screen and the powder was applied electrostatically to a steel plate at 70 kV using a corona gun. The coated plates were baked for ten minutes at 200° C.

Comparative Example 3

157.5 g Crelan® EF 403, 220 g Rucote® XP 2566, 94 g Rucote® 109, 6.0 g Resiflow® PV 88, 2.5 g benzoin, 4.9 g Gas Black FW 200 and 15 g of a micronized PE wax (from BYK) were homogenized for five minutes in a mixer at 10,000 rpm. The mixture was next extruded in a twin-screw extruder at temperatures of 100° C. (zone 1) and 110° C. (zone 2) at a shaft rotational speed of 200 rpm, product temperature 110-115° C., a rotational speed of the feed screw of 15 rpm and a rotational speed of 40 rpm of the cooling roller. The powder coating extrudates were pulverized and then ground finely in a screen-bottom mill at 10,000 rpm. Coarse-grain fractions more than 120 μm in size were removed using a vibrating screen, the powder being electrostatically applied to steel plate using a corona gun at 70 kV. The coated plates were baked for ten minutes at 200° C.

Comparative Example 4

157.5 g Crelan® EF 403, 220 g Rucote® XP 2566, 94 g Rucote® 109, 6.0 g Resiflow® PV 88, 2.5 g benzoin, 4.9 g Gas Black FW 200 and 15 g of a powdered synthetic polymer (Ceraflour® 967, from BYK) were homogenized for five minutes at 10,000 rpm in a mixer. Next the mixture was extruded in a twin-screw extruder at temperatures of 100° C. (zone 1) and 110° C. (zone 2) at a shaft rotational speed of 200 rpm, product temperature 110-115° C., a rotational speed of the feed screw of 15 rpm and a cooling roll rotational speed of 40 rpm. Powder coating extrudates were pulverized and then ground finely in a screen-bottom mill at 10,000 rpm. Coarse-grain fractions larger than 120 μm in size were removed using a vibrating screen and the powder was electrostatically applied steel plates using a corona gun at 70 kV. The coated plates were baked for ten minutes at 200° C.

The resulting powder coatings were tested to determine their reactivity, their flexibility, their resistance to chemicals, their abrasion resistance, their resistance to yellowing and their gloss.

The analyses that were performed are summarized briefly below:

Reactivity

The reactivity of a system was determined according to the gelation time. A marked increase in viscosity was observed due to the formation of the polymer network. The time of this change in property was determined using a shearing disc viscometer at 200° C.

Flexibility

The flexibility of the coating system was determined with the help of the Erichsen indentation according to DIN EN 50101. The plate coated with the powder coating was held on the die by a hold-down force and a hardened ball was pressed against the plate from beneath, thereby inducing a cold deformation. The distance traveled until a crack developed was recorded.

Resistance to Chemicals

The coated plates were provided with acetone and covered with sheets of glass. The solvent was allowed to act overnight. The next day the acetone resistance was evaluated visually, using the following scale:

TABLE IV

Surface Acetone Resistance

| Grade | Explanation |
|---|---|
| 0 | no change in surface |
| 1 | very slight change in surface |
| 2 | slight change in surface |
| 3 | change in surface |
| 4 | great change in surface |
| 5 | complete change in surface |

Abrasion Resistance

To test the abrasion resistance, the surface was treated with 10 double strokes of sandpaper weighted with 500 g, and then the gloss of the scratched surfaces was evaluated. The residual gloss in % was used as a measure of the abrasion resistance.

Colorimetry

The color values were measured using a convention color value meter (X-Rite Color Eye 7000a) as the difference in comparison with a standard. The results are given in lab format. The Lab color space is a measurement space comprising all perceptible colors and is independent of the device. The color measurement is performed according to DIN 6174.

Gloss

The gloss was measured using a BYK haze-gloss meter according to DIN EN ISO 2813.

TABLE IV flexibility, resistance to chemicals and residual gloss after abrasion

| Example | Example indentation (mm) | Resistance to chemicals | Residual gloss after abrasion |
|---|---|---|---|
| 7 | 8.5 | 3 | 86.5 |
| 8 | 7.0 | 3 | 90.8 |
| 9 | 6.5 | 3 | 69.3 |
| Comparative 1 | 6.0 | 3 | 68.8 |
| Comparative 2 | 2.7 | 3 | 34.8 |
| 10 | 8.3 | 2 | 68.3 |
| 11 | 6.5 | 1 | 73.5 |
| 12 | 8.3 | 2 | 68.3 |
| 13 | 7.2 | 1 | 72.3 |
| 14 | 7.9 | 1 | 74.5 |
| Comparative 3 | 5.8 | 3 | 63.7 |
| Comparative 4 | 7.8 | 2 | 33.0 |

A negative effect on the reactivity or colorimetry not found in any of the examples.

The goal was in particular to produce an additive having at least 50% residual gloss and an Erichsen indentation of at least 6.5 mm. Comparative Examples 2 and 4 fail to achieve the minimum criterion of abrasion resistance, expressed by a residual gloss of more than 50%. Although Comparative Examples 1 and 3 yield adequate abrasion resistance, they do not meet the minimum requirements for flexibility of the coating.

The products from the examples solve the stated problem of achieving an improved abrasion resistance and flexibility as demonstrated in FIG. 1.

By using dialkyl ethers with and without carriers, the properties with respect to flexibility, resistance to chemicals and abrasion resistance of the powder coating can be improved significantly without having any effect on the reactivity or colorimetry.

The invention claimed is:

1. A composition for producing coatings, containing at least one curable binder and at least one dialkyl ether having 24 or more carbon atoms wherein the at least one dialkyl ether is present in the solid state in the composition and the composition is in the liquid state or forms a powder, wherein the at least one dialkyl ether in the composition is applied to an inorganic carrier or the at least one dialkyl ether in the composition has an average particle size of less than 150 μm.

2. The composition according to claim 1, characterized in that the at least one dialkyl ether used contain more than 95 mol % linear alkyl moieties.

3. The composition according to claim 1, characterized in that the at least one dialkyl ether has a melting point of more than 25° C. according to DIN EN ISO 6321.

4. The composition according to claim 1, characterized in that the at least one dialkyl ether is at least one member selected from the following group: didodecyl ether, ditetradecyl ether, dihexadecyl ether, doctadecyl ether, dieicosyl ether and didocosyl ether.

5. The composition according to claim 1, characterized in that the at least one dialkyl ether is milled together with an inorganic carrier to produce a milled product and is used to produce the coating.

6. The composition according to claim 5, characterized in that prior to being used in the composition, the milled product has been tempered at 5° C. or more above the melting point of the dialkyl ether used or the dialkyl ether mixture used.

7. The composition according to claim 1, characterized in that the inorganic carrier is silica, alumina or a mixture of silica and alumina.

8. The composition according to claim 1, characterized in that the at least one dialkyl ether used is used in amounts of
   a) 0.1 to 5.0 wt %, in solid compositions, and
   b) 0.05 to 3.0 wt %, in liquid compositions.

9. The composition according to claim 1, characterized in that the at least one dialkyl ether used has a purity of greater than 95 wt %, based on the at least one dialkyl ether.

10. A hardened coating containing the composition according to claim 1 obtained by curing and/or crosslinking at least the binder in the composition.

11. A hardened coating containing the composition according to claim 1 characterized in that the hardened coating contains 0.1 to 5.0 wt %, of the dialkyl ether(s).

12. A hardened coating containing the composition according to claim 1, characterized in having an Erichsen indentation according to DIN 50101 of at least 6.1 mm, and a residual gloss of at least 50%.

* * * * *